United States Patent [19]
Wempe

[11] 4,386,183
[45] May 31, 1983

[54] RELEASE COATINGS BASED ON POLYVINYL ALCOHOL

[75] Inventor: Lawrence K. Wempe, Center Valley, Pa.

[73] Assignee: Air Products and Chemicals, Inc., Allentown, Pa.

[21] Appl. No.: 254,833

[22] Filed: Apr. 16, 1981

[51] Int. Cl.$^3$ .............................................. C08K 3/38
[52] U.S. Cl. .................................. 524/405; 524/156; 524/167; 524/245; 524/375
[58] Field of Search ................ 260/29.6 BM; 524/405

[56] References Cited

U.S. PATENT DOCUMENTS

| | | | |
|---|---|---|---|
| 3,438,808 | 4/1969 | Hawkins et al. | 260/29.6 BM |
| 3,632,362 | 1/1972 | Urushiyama et al. | 260/29.6 BM |
| 3,634,296 | 1/1972 | Wade | 260/29.6 BM |
| 4,012,352 | 3/1977 | Deyrup | 260/29.6 BM |
| 4,016,129 | 4/1977 | Miyosawa | 260/29.6 BM |

OTHER PUBLICATIONS

Hackh's Chemical Dictionary, p. 687.

*Primary Examiner*—Joseph L. Schofer
*Assistant Examiner*—N. Sarofim
*Attorney, Agent, or Firm*—Michael Leach; E. Eugene Innis; James C. Simmons

[57] ABSTRACT

Polyvinyl alcohol based release coating compositions for strippable substrates which are in contact with pressure sensitive adhesives are disclosed. Substrates coated with the release compositions are easily peeled from pressure sensitive adhesive coated substrates without substantially adversely affecting the adhesive character of the adhesive coated substrate. The release coating composition comprises polyvinyl alcohol, a migratable release promoting agent, a water soluble salt of a coordinating metal and a water soluble boron compound in an aqueous solution. In addition to composites comprising release coated substrates affixed to adhesive coated substrates, the release compositions can be applied to the backing of a pressure sensitive adhesive tape to permit facile uncoiling of the rolled tape product.

7 Claims, 4 Drawing Figures

RELEASE COATINGS BASED ON POLYVINYL ALCOHOL

TECHNICAL FIELD

This invention relates to release coating compositions for strippable substrates in contact with pressure sensitive adhesives. More particularly, this invention relates to aqueous polyvinyl alcohol compositions suitable for use as one step release coatings for plastic, paper and related fibrous substrates.

BACKGROUND OF THE INVENTION

A protective sheet or covering material is usually affixed to pressure sensitive adhesive coated materials to protect the adhesive coating. The protective sheet is rendered easily removable from the adhesive layer by providing the sheet with a coating of a material having good release properties. Ideally, one should be able to peel away the protective sheet without taking the adhesive coating with it and without destroying, even after long contact, the aggressiveness of the adhesive in its ultimate application. For example, in the manufacture of die cut printed labels, bumper stickers and double faced tapes having a layer of a pressure sensitive adhesive as a means for securing such items, a paper or plastic sheet having a release coating on one side has been employed to protect the adhesive layer prior to use. This is particularly true where the pressure sensitive adhesive coated substrates must be shipped, handled and stored on top of one another. Similarly, in the manufacture of pressure sensitive adhesive tapes the side of the tape opposite that to which the pressure sensitive adhesive is applied contains a coating of a release material to permit facile separation of the adhesive and the backing when the tape is unwound.

The ability to release the protective sheet from an affixed adhesive layer in a controlled manner is not the only requirement for a commercially acceptable release agent. If the release materials travel into the adhesive or remain on the adhesive surface, the tackiness of the adhesive is diminished. Since most adhesive coated substrate/release paper composites are shipped and stored for relatively long periods of time, frequently under high temperature and high humidity conditions, there is ample opportunity for deleterious migration to occur unless the release agent is securely "locked" at the surface of the release paper.

Currently used release materials include silicones, fluorocarbons, fatty acid/metal complexes and hydrocarbon waxes. The silicone and fluorocarbons suffer from their extreme high costs, difficulty in handling due to organic solvent or chemical instability and the tendency to give excessive release leading to mechanically unstable composites. The fatty acid/metal complexes have many of the same problems in addition to an inherently intense color which is frequently undesirable for aesthetic reasons. To overcome the cost factors these materials are usually applied in a two step process over an impervious barrier coat of polyvinyl alcohol or other material which prevents absorption into the paper and fills tiny surface voids. Hydrocarbon waxes, while being low in cost, tend to undergo cohesive failure leaving wax affixed to the adhesive with resultant losses in final adhesive performance. Thus the waxes are usually found only in low cost, nondemanding applications.

U.S. Pat. No. 2,491,642 discloses the use of polyethylene oxide as a stripping agent in polyvinyl alcohol compositions in the formation of polyvinyl alcohol films by continuous casting on a metal casting surface.

U.S. Pat. No. 2,985,544 discloses aqueous emulsions that can be used to render paper nonadherent to various organic solids. The emulsion compositions comprise (1) a linear polydimethylsiloxane having terminal silicone bonded hydroxyl groups, (2) a methylpolysiloxane resin, (3) polyvinyl alcohol as emulsifying agent and (4) dibutyl tin dilaurate. The dibutyl tin dilaurate gave minimal migration of the methylpolysiloxanes to the surface of the paper.

U.S. Pat. No. 3,257,348 discloses compositions for making chlorine resistant polyvinyl alcohol films comprising an incompletely hydrolyzed polyvinyl alcohol, a polyoxyethylene aryl ether and, optionally, an alkali metal salt of mixed phosphate esters of an ethoxylated higher alkyl phenol as a plasticizing agent.

U.S. Pat. No. 3,690,924 discloses a release coating comprising polyvinyl alcohol, a fluorochemical containing a nonpolar "head" portion of a polyfluorocarbon and a polar "tail" portion which is a carboxylic acid group of the Werner complex type with chromium, and an insolubilizer for polyvinyl alcohol. Insolubilizer materials can be metal salts, for example, chromic nitrate and sodium, potassium, ammonium and cupric dichromate; cuprammonium hydroxide and titanium lactate.

U.S. Pat. No. 3,933,702 discloses a release coating composition comprising a hydrocolloid stabilized-aqueous emulsion of a crosslinkable vinyl-type polymer and a release promoting compound such as organosilicone compounds. Polyvinyl alcohol may be employed as the sole emulsifying agent.

U.S. Pat. No. 4,049,860 discloses a paper support carrying an anti-adhesive layer which comprises polyvinyl alcohol, a polysiloxane and a polyalkylene glycol wax.

U.S. Pat. No. 4,142,014 discloses thermally resistant release coating compositions comprising solutions or emulsions of metal salts of hydrolyzed long chain alkyl vinyl ethermaleic anhydride copolymer. Metal oxides or hydroxides of metals such as sodium, potassium, lithium, copper, zinc, chromium, iron, lead and antimony may be used to form the salts.

U.S. Pat. No. 4,146,511 discloses a resin composition for peel-off coatings which contain a film forming polymeric resin such as polyvinyl alcohol, and organosiloxane having a polyoxyalkylene group in the side chain and a solvent.

U.S. Pat. No. 4,241,198 discloses a release coating agent containing a copolymer of (1) a monomer mixture comprising stearyl acrylate and/or stearyl methacrylate and (2) an ethylenically unsaturated compound having functional groups reactive with metal alcoholate, and a metal alcoholate for crosslinking the functional groups.

Nevertheless, there remains a need for an effective release coating which is relatively low in cost and can be applied from a water medium.

There is yet a need for an effective polyvinyl alcohol based release coating that is applied in a one step coating operation and does not adversely effect the readhesive qualities of a pressure sensitive adhesive coated substrate.

Further, there is a need for a polyvinyl alcohol based release coating that permits the release agents to migrate to the surface of the release coating without substantially travelling into the adhesive layer or remaining on the adhesive surface upon removal of the protective sheet containing the release coating.

SUMMARY OF THE INVENTION

The above needs have been satisfied by my invention of an aqueous release coating composition comprising a mixture of water and
(a) a polyvinyl alcohol,
(b) a migratable release promoting agent,
(c) a water soluble salt of a coordinating metal, and
(d) a water soluble boron compound.

Substrates, such a plastic, paper or other fibrous materials in sheet or strip form, may be coated with the above composition on one side or on both sides to afford, upon drying, a release coated substrate to protect pressure sensitive adhesive coated substrate and to produce release coated substrate-adhesive coated substrate composites. The release coating compositions may be applied to the backing of a strip or tape which contains a coating of pressure sensitive adhesive materials on the opposite side prior to rolling the strip or tape. Such release coated substrates and release coated substrate-adhesive coated substrate composites are additional embodiments of the invention.

The polyvinyl alcohol may be present in the aqueous medium in an amount up to 25% by weight, preferably 5 to 12% by weight. The polyvinyl alcohol used in this invention can be a polyvinyl alcohol which is about 80 to 100 mole percent hydrolyzed. It is also preferred that the polyvinyl alcohol be hydrolyzed at greater than 88 mole percent and, advantageously, should be a higher molecular weight polyvinyl alcohol in the viscosity average molecular weight range of about 20,000 to 120,000.

The release promoting agent may be any surface active agent (surfactant) exhibiting release promoting properties and surface activity in water and having a hydrophilic region which tends to bury itself in the water mass. In other words, the agent migrates toward and tends to accumulate at the water surface with its hydrophobic region "protruding" from the surface. Further, the surface active agent must demonstrate release promoting ability. Surface active agents possessing such ability can be identified by a simple test which is described hereinafter under the subheading "Identification of Surfactants as Migratable Release Promoting Agents." Such surfactants may be ionic or nonionic in character.

Examples of surfactants which are useful in the release coating compositions of this invention are amine polygylcol condensates, alkylarylpolyalkylene oxides, salts of long chain alkyl sulfates, N-alkyl sulfosuccinamates and dialkyl esters of sulfosuccinic acids. Other surfactants which may serve as release promoting agents include, by way of example, silicones, fluorocarbons of ionic or nonionic character, quaternary alkyl ammonium salts, polyols, mono- di- and trialkanoic esters of polyols such as sorbitan monopalmitate, monooleate and tristearate, polyalkyloxy ethers of monoalkanoic esters of polyols, and the like. The release coating composition should contain from 5 to 25% release agent (based on weight of polyvinyl alcohol), preferably 5 to 10%.

Coordinating metals are those elements which form coordination complexes with electron donor molecules. Since the invention is directed to aqueous polyvinyl alcohol release coating compositions, water soluble salts of such coordinating metals are required. It is preferred that the coordinating metal be a coordinating transition metal, particularly a chelating transition metal. By transition metal, I mean those elements in the fourth period of the Periodic Table from scandium (atomic number 21) through zinc (atomic number 30) inclusive. Zinc, copper and titanium are the preferred chelating transition metals. Examples of appropriate water soluble salts are zinc acetate; soluble copper (II) salts, such as copper (II) sulfate, copper (II) acetate; iron (II) sulfate; chromium (III) nitrate; and calcium chloride. From 100 to 200 mole % water soluble salt (based on moles of surfactant functional groups) is desirable.

Useful in the release coating compositions as water soluble boron compounds are boric acid, sodium metaborate, sodium tetraborate, borax and disodium octaborate tetrahydrate. The water soluble boron compounds should be present in such amounts that the viscosity of the solution does not exceed that which is consistent with the coating operation.

With reference to the salts of the coordinating metals and boron compounds, "water soluble" means the salt or compound is capable of sufficiently dissolving or dispersing in water to yield an aqueous solution or dispersion that is effective for its intended use in the release coating compositions of this invention.

DESCRIPTION OF THE DRAWINGS

FIG. 1 shows freshly cast wet coating film.
FIG. 2 shows wet coating film after momentary standing.
FIG. 3 shows a partially dried release coating film.
FIG. 4 shows a completely dried film.

DETAILED DESCRIPTION OF THE INVENTION

Surface activity is a phenomenon whereby molecules of the appropriate structure tend to concentrate themselves at surfaces or interfaces thus altering the surface or interfacial energy. Agents which are surface active in water possess a hydrophobic region which tends to protrude from the water surface and a hydrophilic region which tends to bury itself in the water mass. These tendencies remain to a certain degree even though a polymer is dissolved or dispersed in the water along with the surface active agent. Thus aqueous polyvinyl alcohol solutions containing small amounts of surfactants should be "surfactant rich" at the surface and "polyvinyl alcohol rich" in the bulk of the solution.

Figure 2:
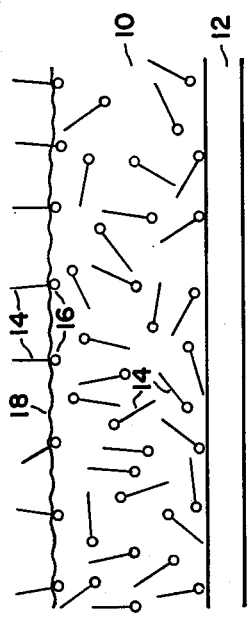
FIGS. 1-4 show the stages of release surface development in a film of a release coating composition.
Figure 1:
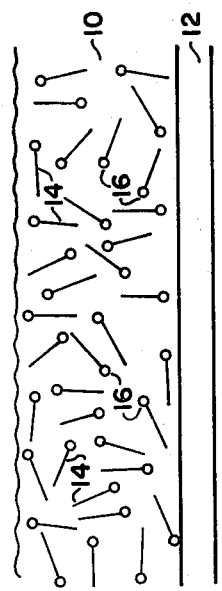

Without being held to the following theory, it is believed that the mode of the inventive release coating compositions may be explained as follows:

In FIG. 1 an aqueous polyvinyl alcohol/surfactant coating 10 has been freshly applied to substrate 12 as a film. The molecules of the surfactant having hydrophobic portion 14 and hydrophilic portion 16 are randomly distributed. After standing for a short period of time, the hydrophobic portion 14 of the surfactant molecules, as seen in FIG. 2, begin to congregate and protrude from water surface 18.

Figure 3:
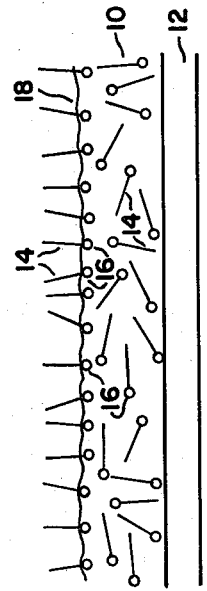

As films of the release coating composition begin to dry, as seen in FIG. 3, this concentration gradient is enhanced by the tendency of the low molecular weight surfactant to migrate to the point of solvent loss (the surface 18) more easily than the higher molecular weight polymer. Such surface migration should be accelerated by the hydrophobic portion 14 of the surfactant molecule. This "spewing" of the surfactant and other low molecular weight materials is commonly observed during the drying of aqueous polymer films. An analogous process also occurs with organic solvents.

Figure 4:
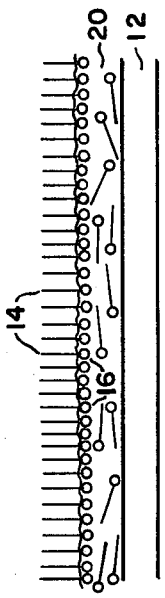

It is believed, therefore, that a dried film 20 of an aqueous polyvinyl alcohol/surfactant mixture as shown in FIG. 4, contains a layer rich in low surface energy hydrophobes 14 at the water loss surface 18 and is primarily polyvinyl alcohol in the lower regions of the film 20. This is the same condition achieved by a two step coating operation usually employed with expensive release agents in which a barrier layer of polyvinyl alcohol is first cast on the substrate surface followed by a coating of the release agent.

Referring again to the Figures, the release promoting agents in the aqueous polyvinyl alcohol compositions have a convenient handle in the form of the hydrophilic portion 16 of the molecule. The ionic functionality, or the polyether functionality in the case of nonionic surfactants, can form stable coordination complexes with many metal ions. In addition, polyvinyl alcohol forms chelate complexes with transition metals. Attempting to combine these complexation tendencies in a unique manner, water-soluble salts of coordinating, metals, in particular salts of transition metals such as zinc, copper and titanium, and water soluble boron compounds are added to the release coating compositions in order to bind the hydrophilic end 16 of the release promoting agents into the polyvinyl alcohol mass of film 20.

Zinc salts are especially desirable since the ammonia complexes of these salts are very stable and water soluble. The zinc ion would undergo only minimum complexation with polyvinyl alcohol or the release agent as long as an abundance of ammonia were present. Thus the bulky zinc ion would not significantly retard the desired migration of the release promoting agent to the surface and only after virtually all the ammonia had escaped from the dried film would polyvinyl alcohol-zinc ion-release agent complexes form at the surface.

Water-soluble boron compounds are added as a material that forms stable adducts to polyvinyl alcohol in order to assist in this binding mechanism. It is believed that a water soluble boron compound such as boric acid, in conjunction with the coordinating metal, induces complexation of the release promoting agent at the surface. Once the film is dry this complexation retards or substantially prevents migration of the agent into an affixed adhesive layer with the consequent loss in readhesion.

Although not depicted in FIG. 4, the coordinating metal and the boron compound can be imagined as binding the hydrophilic ends 16 to the vinyl alcohol polymer composing the dried film 20 and thus securely holding the exposed hydropholic ends 14.

U.S. Pat. Nos. 3,135,648 and 3,320,200 disclose the use of water soluble boron compounds in polyvinyl alcohol adhesive compositions to increase wet tackiness.

With regard to the specific embodiments, in general, 10% aqueous solutions of a fully hydrolyzed polyvinyl alcohol were doped with 5% (based on the weight of polyvinyl alcohol) release promoting agent. Small amounts of boric acid and zinc ammonium carbonate were also added. When cast as a 4 mil wet film on a glass substrate and dried at 120° C. for 10 minutes, a release coated substrate was obtained which demonstrated only a fraction of the adhesive force to masking tape that the tape showed to unmodified polyvinyl alcohol or to an uncoated substrate. In addition to manifesting good release properties, these release coatings did not substantially contaminate the adhesive layer as evidenced by the ability of the removed tapes to readhere to the glass surface essentially as well as tape which had not been in contact with the release agent.

Table 1 lists the release promoting agents used in the Examples.

TABLE 1

| Trademark | Manufacturer | Class and Formula | Type |
|---|---|---|---|
| Aerosol 18 | American Cyanamide Industrial Chemical Div. | Disodium N—Octa-Decylsulfosuccinamate | Anionic |
| Aerosol OT | American Cyanamide Industrial Chemical Div. | Dioctyl Ester of Sodium Sulfosuccinic Acid | Anionic |
| Duponol WAQE | DuPont Company | Sodium Lauryl Sulfate | Anionic |
| Sipex UB | Alcolac, Inc. | Sodium Lauryl Sulfate | Anionic |
| Triton CF-32 | Rohm & Haas Co. | Amine Polyglycol Condensate | Nonionic |
| Triton X-100 | Rohm & Haas Co. | Octylphenoxy Polyethoxy Ethanol | Nonionic |

Identification of Surfactants as Migratable Release Promoting Agents

Aqueous test solutions containing 10% polyvinyl alcohol, which is fully hydrolyzed and has a viscosity for a 4% aqueous solution at 20° C. of 5 to 7 cps (low), and 5% (based on the weight of polyvinyl alcohol) surface active agent are prepared. Films of the aqueous mixture are prepared using a 0.004 in (0.1 mm) Bird bar to apply the mixture to a glass plate. The film is dried by heating the plate in a preheated electric oven for approximately 10 minutes at 120°–125° C.

The release promoting ability of the surfactant-containing film is evaluated using the procedure described hereinafter under the subheading "Determination of Release and Readhesion Values." A surfactant whose aqueous test solution yields a dry film that demonstrates a release value less than that obtained from unmodified polyvinyl alcohol film is a migratable release promoting agent for purposes of the release coating compositions of this invention.

Preparation of Release Layers

Release layers were prepared from a 10% aqueous solution of the appropriate polyvinyl alcohol to which was added 5% (based on weight of polyvinyl alcohol) of a release promoting agent. Zinc ammonium carbonate, boric acid and sodium chloride were added where indicated in the following examples as 0.5 M solutions. All solutions were adjusted to pH 10 with concentrated aqueous ammonia. Wet films were cast on clean 4×6 inch (10.2×15.2 cm.) glass plates using a 0.004 inch (0.1 mm) Bird bar and the films were dried immediately in a 255° F. (125° C.) forced draft oven for 10 minutes. Heating up of the 1/16 inch (1.6 mm) thick plates required a significant portion of the time. The coated plates were evaluated within 12 to 24 hours of preparation according to the following procedure.

Determination of Release and Readhesion Values

A 5 inch (12.7 cm) region at the end of a 12×1 inch (30.5×2.54 cm) strip of Highland masking tape (3M Company) was gently placed in position on the glass supported polyvinyl alcohol film and pressed in place by one rolling pass of a 4 inch (10.2 cm) diameter 4.3 pound (1.95kg) roller. The roller comprised a rigid plastic jar filled with lead bars. All release values were measured within 4 hours of tape application.

Release values were determined by clamping one end of the glass plate in one jaw of an Instron tester equipped with a 0–50 pound sensor. The loose end of the tape, folded back 180 degrees back to back with the affixed portion, was clamped in the other jaw. Separation of the jaws at the rate of 1 inch per minute (2.54 cm per minute) gave a recorder trace whose average value was the force necessary for 180 degrees release.

Readhesion or the effect of the release promoting agent on adhesive performance was measured by reapplying the peeled portion of the tape to a clean glass plate and peeling again at 180 degrees in the same manner as described above. Readhesion values were compared to peel strengths for fresh tape on clean glass plates and Avery silicone release paper.

Preparation of 0.5 M Zinc Ammonium Carbonate

A mixture of 0.50 moles zinc oxide and 0.55 moles ammonium carbonate was diluted with water to 800 ml. The resultant slurry was kept at pH 10 with concentrated aqueous ammonia and stirred until a clear solution was obtained. The solution was diluted to exactly 1000 ml and the pH was readjusted to 10 with concentrated aqueous ammonia giving a 0.5 M solution of zinc ammonium carbonate.

In the following examples the release coating compositions utilized polyvinyl alcohol marketed under the VINOL trademark by Air Products and Chemicals, Inc. VINOL 107, VINOL 325 and VINOL 350 polyvinyl alcohols are fully hydrolyzed (98.0 to 98.8%) and have a viscosity for a 4% aqueous solution at 20° C. of 5 to 7 cps (low), 28 to 32 cps (medium) and 55 to 65 cps (high), respectively. Since changes in the molecular weight affect solution viscosity, the molecular weight is specified by the viscosity of a 4% aqueous solution.

Examples 1 to 28 used VINOL 107 polyvinyl alcohol (low molecular weight), Examples 29 through 56 used VINOL 325 polyvinyl alcohol (medium molecular weight) and Examples 57 through 68 used VINOL 350 (high molecular weight). Examples 1 through 4, 29 through 32, and 57 through 60 contained no release promoting agent while Examples 5 through 28, 33 through 56 and 61 through 68 contained 5% weight (based on weight of polyvinyl alcohol) of the designated release promoting agent. As indicated in the tables 0.3 ml of 0.5 M boric acid or 1.0 ml of 0.5 M zinc ammonium carbonate, or both, were added per 100 ml of the aqueous release agent-polyvinyl alcohol solution. These volumes were considered to be the maximum amounts that could be added to the 10% polyvinyl alcohol solution without causing excessive viscosity. Data regarding the examples are presented in Tables 2, 3 and 4 for low molecular weight, medium molecular weight, and high molecular weight polyvinyl alcohol solutions, respectively.

TABLE 2

Release Films Cast From 10% Aqueous Vinol 107 Solutions Modified With 5% (on PVOH wt.) Release-Promoting Agent (.004" Wet Film Thickness)

| Example No. | Release-Promoting Agent | 0.5M H₃BO₃ ml/100 ml Solution | 0.5M Zn(NH₃)₂CO₃ ml/100 ml Solution | Appearance of Solution | Release lb/in | Readhesion lb/in |
|---|---|---|---|---|---|---|
| 1 | Unmodified Vinol 107 | — | — | Clear | 1.19 | 0.71 |
| 2 | None | 0.3 | — | Clear | 1.15 | 0.46 |
| 3 | None | — | 1.0 | Hazy | 1.10 | 0.64 |
| 4 | None | 0.3 | 1.0 | Hazy | 0.80 | 0.63 |
| 5 | Aerosol 18 | — | — | Hazy-foamy | 0.24 | 0.77 |
| 6 | Aerosol 18 | 0.3 | — | Hazy-foamy | 0.40 | 0.74 |
| 7 | Aerosol 18 | — | 1.0 | Hazy-foamy | 0.49 | 0.66 |
| 8 | Aerosol 18 | 0.3 | 1.0 | Hazy-foamy | 0.30 | 0.67 |
| 9 | Aerosol OT | — | — | Sl. Hazy-foamy | 0.36 | 0.75 |
| 10 | Aerosol OT | 0.3 | — | Sl. Hazy-foamy | 0.84 | 0.49 |
| 11 | Aerosol OT | — | 1.0 | Sl. Hazy-foamy | 0.40 | 0.56 |
| 12 | Aerosol OT | 0.3 | 1.0 | Sl. Hazy-foamy | 0.44 | 0.65 |
| 13 | Duponol WAQE | — | — | Clear-foamy | 0.34 | 0.54 |
| 14 | Duponol WAQE | 0.3 | — | Clear-foamy | 0.36 | 0.70 |
| 15 | Duponol WAQE | — | 1.0 | Hazy-foamy | 0.42 | 0.21 |
| 16 | Duponol WAQE | 0.3 | 1.0 | Hazy-foamy | 0.35 | 0.66 |
| 17 | Sipex UB | — | — | Clear-foamy | 0.37 | 0.49 |
| 18 | Sipex UB | 0.3 | — | Clear-foamy | 0.42 | 0.72 |
| 19 | Sipex UB | — | 1.0 | Hazy-foamy | 0.76 | 0.64 |
| 20 | Sipex UB | 0.3 | 1.0 | Hazy-foamy | 0.43 | 0.72 |
| 21 | Triton CF-32 | — | — | Hazy | 0.25 | 0.33 |
| 22 | Triton CF-32 | 0.3 | — | Hazy | 0.28 | 0.85 |
| 23 | Triton CF-32 | — | 1.0 | Hazy | 0.52 | 0.57 |
| 24 | Triton CF-32 | 0.3 | 1.0 | Hazy | 0.10 | 0.80 |
| 25 | Triton X-100 | — | — | Clear-foamy | 0.13 | 0.32 |
| 26 | Triton X-100 | 0.3 | — | Clear-foamy | 0.42 | 0.70 |
| 27 | Triton X-100 | — | 1.0 | Hazy-foamy | 0.47 | 0.85 |
| 28 | Triton X-100 | 0.3 | 1.0 | Hazy-foamy | 0.44 | 0.78 |
| | Uncoated Glass | | | | 0.91 | 0.70 |
| | Avery Silicone | | | | 0.02 | 0.91 |

TABLE 2-continued

Release Films Cast From 10% Aqueous Vinol 107 Solutions
Modified With 5% (on PVOH wt.) Release-Promoting Agent
(.004" Wet Film Thickness)

| Example No. | Release-Promoting Agent | 0.5M $H_3BO_3$ ml/100 ml Solution | 0.5M $Zn(NH_3)_2$ $CO_3$ ml/100 ml Solution | Appearance of Solution | Release lb/in | Readhesion lb/in |
|---|---|---|---|---|---|---|
| | Release Paper | | | | | |

TABLE 3

Release Films Cast From 10% Aqueous Vinol 325 Solutions
Modified With 5% (on PVOH wt.) Release-Promoting Agent
(.004" Wet Film Thickness)

| Example No. | Release-Promoting Agent | 0.5M $H_3BO_3$ ml/100 ml Solution | 0.5M $Zn(NH_3)_2$ $CO_3$ ml/100 ml Solution | Appearance of Solution | Release lb/in | Readhesion lb/in |
|---|---|---|---|---|---|---|
| 29 | Unmodified Vinol 325 | | | Clear | 1.32 | 0.80 |
| 30 | None | 0.3 | — | Clear | 1.04 | 0.69 |
| 31 | None | — | 1.0 | Clear | 1.15 | 0.75 |
| 32 | None | 0.3 | 1.0 | Hazy | 1.20 | 0.74 |
| 33 | Aerosol 18 | — | — | Hazy-foamy | 0.36 | 0.77 |
| 34 | Aerosol 18 | 0.3 | — | Hazy-foamy | 0.42 | 0.61 |
| 35 | Aerosol 18 | — | 1.0 | Hazy | 0.37 | 0.74 |
| 36 | Aerosol 18 | 0.3 | 1.0 | Hazy | 0.43 | 0.60 |
| 37 | Aerosol OT | — | — | Sl. Hazy | 0.88 | 0.63 |
| 38 | Aerosol OT | 0.3 | — | Sl. Hazy-foamy | 0.52 | 0.61 |
| 39 | Aerosol OT | — | 1.0 | Hazy | 0.62 | 0.47 |
| 40 | Aerosol OT | 0.3 | 1.0 | Hazy | 0.50 | 0.50 |
| 41 | Duponol WAQE | — | — | Clear-foamy | 0.32 | 0.68 |
| 42 | Duponol WAQE | 0.3 | — | Clear-foamy | 0.42 | 0.57 |
| 43 | Duponol WAQE | — | 1.0 | Hazy-foamy | 0.43 | 0.50 |
| 44 | Duponol WAQE | 0.3 | 1.0 | Hazy-foamy | 0.37 | 0.21 |
| 45 | Sipex UB | — | — | Clear-foamy | 0.45 | 0.61 |
| 46 | Sipex UB | 0.3 | — | Clear-foamy | 0.42 | 0.59 |
| 47 | Sipex UB | — | 1.0 | Hazy-foamy | 0.50 | 0.70 |
| 48 | Sipex UB | 0.3 | 1.0 | Hazy-foamy | 0.24 | 0.67 |
| 49 | Triton CF-32 | — | — | Hazy | 0.06 | 0.42 |
| 50 | Triton CF-32 | 0.3 | — | Hazy | 0.11 | 0.66 |
| 51 | Triton CF-32 | — | 1.0 | Hazy | 0.08 | 0.75 |
| 52 | Triton CF-32 | 0.3 | 1.0 | Hazy | 0.02 | 0.90 |
| 53 | Triton X-100 | — | — | Hazy-foamy | 0.34 | 0.92 |
| 54 | Triton X-100 | 0.3 | — | Hazy-foamy | 0.18 | 0.60 |
| 55 | Triton X-100 | — | 1.0 | Hazy-foamy | 0.50 | 0.95 |
| 56 | Triton X-100 | 0.3 | 1.0 | Hazy-foamy | 0.37 | 0.75 |
| | Uncoated Glass | | | | 0.91 | 0.70 |
| | Avery Silicone Release Paper | | | | 0.02 | 0.91 |

TABLE 4

Release Films Cast From 10% Aqueous Vinol 350 Solutions
Modified With 5% (on PVOH wt.) Release-Promoting Agent
(.004" Wet Film Thickness)

| Example No. | Release-Promoting Agent | 0.5M $H_3BO_3$ ml/100 ml Solution | 0.5M $Zn(NH_3)_2$ $CO_3$ ml/100 ml Solution | Appearance of Solution | Release lb/in | Readhesion lb/in |
|---|---|---|---|---|---|---|
| 57 | Unmodified Vinol 350 | | | Clear | 1.26 | 0.80 |
| 58 | None | 0.3 | — | Clear | 0.94 | 0.51 |
| 59 | None | — | 1.0 | Clear | 1.34 | 0.74 |
| 60 | None | 0.3 | 1.0 | Hazy | 1.05 | 0.76 |
| 61 | Triton CF-32 | — | — | Hazy | 0.02 | 0.75 |
| 62 | Triton CF-32 | 0.3 | — | Hazy | 0.04 | 0.80 |
| 63 | Triton CF-32 | — | 1.0 | Hazy | 0.05 | 0.80 |
| 64 | Triton CF-32 | 0.3 | 1.0 | Hazy | 0.01 | 0.90 |
| 65 | Triton X-100 | — | — | Hazy | 0.25 | 1.05 |
| 66 | Triton X-100 | 0.3 | — | Hazy | 0.27 | 0.71 |
| 67 | Triton X-100 | — | 1.0 | Hazy | 0.20 | 0.64 |
| 68 | Triton X-100 | 0.3 | 1.0 | Hazy | 0.30 | 0.71 |
| | Uncoated Glass | | | | 0.91 | 0.70 |
| | Avery Silicone Release Paper | | | | 0.02 | 0.91 |

The data in the tables indicate that release surfaces can be prepared by coating with aqueous polyvinyl alcohol solutions containing a migratable release promoting agent and small amounts of complexing agents such as zinc salts and boric acid. Such release surfaces do not substantially diminish the performance of the adhesive. In other words, the readhesion values of a pressure sensitive masking tape whose adhesive surface had been separated from contact with a release coating were acceptable.

Due to the broad 0–50 pound range of the sensor on the Instron tester and the fact that the data obtained were values of about one pound/inch or less, the data in tables demonstrate in an empirical manner only that the release and readhesion properties of the listed inventive compositions are acceptable. Although the data are empirical, some worthwhile general comments can be made. While the compositions having only zinc salt or only boric acid, in some instances, gave as good or possibly better empirical results, the data does not in all cases reflect or demonstrate the advantage achieved when both zinc salt and boric acid were present in terms of release and readhesion values. Moreover, the addition of both zinc salt and boric acid to the polyvinyl alcohol compositions enhances the water resistance of the resultant, dry release coatings on a substrate.

The Avery silicone release paper which was used for comparison as a standard release coated substrate gave a release value of 0.02 lb/in and a readhesion value of 0.91 lb/in. An uncoated glass plate gave release and readhesion values of 0.91 lb/in and 0.70 lb/in, respectively, indicating the masking tape was relatively difficult to remove from the glass plate and lost some of its adhesiveness.

slightly better combination of release and readhesion than the anionic release promoting agents. In particular, Examples 24, 52 and 64 which contained Triton CF-32 surfactant, boric acid and zinc ammonium carbonate in low, medium and high molecular weight polyvinyl alcohol solutions, respectively, showed release and readhesion values comparable with Avery silicone release paper. The preferred level for the nonionic release promoting agents would be in the 2 to 5% range (based on weight of polyvinyl alcohol), at least for 0.004 inch (0.1 mm) films (wet thickness) on glass. This preferred level would be expected to change with the type of release promoting agent, type of complexing agent, film thickness and porosity of the substrate.

The combination of zinc ammonium carbonate and boric acid yielded acceptable readhesion values. Again this is consistent with the proposed theory in that the strong tendency for these materials to complex with the polyvinyl alcohol and the release promoting agent provides an effective mechanism for tightly binding the release promoting agent to the polyvinyl alcohol surface. That this effect is not due merely to ionic strength is evidenced by the failure of sodium chloride, a non-complexing salt, to yield the same result. Table 5 shows the data obtained using polyvinyl alcohol solutions containing sodium chloride in a wide range of concentrations in combination with Triton CF-32 surfactant.

TABLE 5

Effect of Non-Complexing Salts on Release Values of Triton CF-32 Modified PVOH Films
(Films Cast at .004" Wet Thickness From 10% Aqueous PVOH Solutions Modified With 5% Triton CF-32 Where Indicated)

| Example No. | PVOH | Triton CF-32 Level % Based on PVOH Wt. | pH | 0.5M NaCl Added ml/100 ml Solution | Release lb/in | Readhesion lb/in |
| --- | --- | --- | --- | --- | --- | --- |
| 69 | Vinol 107 | None | 6.5 | None | 1.19 | 0.71 |
| 70 | Vinol 107 | None | 6.4 | 0.65 | 1.20 | 0.65 |
| 71 | Vinol 107 | None | 6.5 | 1.30 | 1.10 | 0.60 |
| 72 | Vinol 107 | None | 6.4 | 2.60 | 0.91 | 0.73 |
| 73 | Vinol 107 | 5.0 | 6.6 | 0.65 | 0.50 | 0.87 |
| 74 | Vinol 107 | 5.0 | 6.6 | 1.30 | 0.55 | 0.85 |
| 75 | Vinol 107 | 5.0 | 6.4 | 2.60 | 0.51 | 0.81 |
| 76 | Vinol 325 | None | 6.6 | None | 1.32 | 0.80 |
| 77 | Vinol 325 | None | 6.6 | 0.65 | 1.21 | 0.55 |
| 78 | Vinol 325 | None | 6.6 | 1.30 | 1.20 | 0.70 |
| 79 | Vinol 325 | None | 6.6 | 2.60 | 1.40 | 0.80 |
| 80 | Vinol 325 | None | 6.5 | 6.50 | 1.25 | 0.74 |
| 81 | Vinol 325 | 5.0 | 6.6 | 0.65 | 0.06 | 0.67 |
| 82 | Vinol 325 | 5.0 | 6.5 | 1.30 | 0.17 | 0.70 |
| 83 | Vinol 325 | 5.0 | 6.6 | 2.60 | 0.14 | 0.50 |
| 84 | Vinol 325 | 5.0 | 6.4 | 6.50 | 0.38 | 0.53 |
| 85 | Vinol 350 | None | 6.5 | None | 1.26 | 0.80 |
| 86 | Vinol 350 | None | 6.5 | 0.65 | 1.30 | 0.81 |
| 87 | Vinol 350 | None | 6.5 | 1.30 | 1.35 | 0.71 |
| 88 | Vinol 350 | None | 6.5 | 2.60 | 1.30 | 0.60 |
| 89 | Vinol 350 | None | 6.6 | 6.50 | 1.20 | 0.73 |
| 90 | Vinol 350 | 5.0 | 6.6 | 0.65 | 0.15 | 0.55 |
| 91 | Vinol 350 | 5.0 | 6.6 | 1.30 | 0.42 | 0.58 |
| 92 | Vinol 350 | 5.0 | 6.5 | 2.60 | 0.46 | 0.57 |
| 93 | Vinol 350 | 5.0 | 6.6 | 6.50 | 0.62 | 0.55 |

The higher molecular weight polyvinyl alcohol compositions appear to be superior. This is consistent with my proposed theory in that the larger differential in molecular weight between the polyvinyl alcohol and the low molecular weight release promoting agent would allow for more facile migration of the agent to the surface. However, in practice, limitations of the coating equipment may necessitate lower viscosity solutions and hence lower molecular weight polyvinyl alcohol.

The nonionic release promoting agents Triton CF-32 and Triton X-100 are preferred because they gave a

Statement of Industrial Application

The aqueous release compositions of this invention can be applied as thin films to appropriate substrates such as plastic, paper or other fibrous sheets, films and strip. Evaporation of the solvent yields a release coated substrate which can be easily peeled from pressure sensitive adhesive coated substrates without substantially affecting the subsequent "stickiness" of the adhesive substrate. The release compositions can be used to produce protective sheets for pressure sensitive adhesive substrates, back coats for rolled tapes such as masking tape, food wrappings and casting papers for vinyl plastisols.

What is claimed:

1. A release coating composition consisting essentially of a mixture of water and
    (a) a polyvinyl alcohol,
    (b) a migratable release promoting agent which is a surfactant that in a 10% aqueous polyvinyl alcohol solution at 5 weight % based on the polyvinyl alcohol provides a dried film on a glass plate having a release value of less than about 0.91 pounds per inch determined by applying a 0.004 inch coating of the surfactant modified polyvinyl alcohol solution to the glass plate, heating the coated glass plate for about 10 minutes at 120° to 125° C. to yield a dried film, applying a strip of masking tape to the film by rolling once with a 4.3 pound roller and pulling an edge of the tape away from the film at a 180° angle,
    (c) a water soluble salt of a coordinating metal, and
    (d) a water soluble boron compound which is selected from the group consisting of boric acid, sodium metaborate, sodium tetraborate, borax and disodium octaborate tetrahydrate.

2. The composition of claim 1 in which the coordinating metal is a chelating transition metal.

3. The composition of claim 2 in which the chelating transition metal is selected from the group consisting of zinc, copper and titanium.

4. The composition of claim 3 in which the chelating transition metal is zinc.

5. The compositions of claims 1, 2, 3 or 4 in which the boron compound is boric acid.

6. The composition of claim 1 which contains 5 to 25 wt. % release promoting agent based on weight of polyvinyl alcohol.

7. The composition of claim 1 which contains 5 to 10 wt. % release promoting agent based on the weight of polyvinyl alcohol.

* * * * *